United States Patent [19]

Morris et al.

[11] Patent Number: 4,914,179

[45] Date of Patent: Apr. 3, 1990

[54] COPOLYESTERS FROM 4,4'-BIPHENYLDICARBOXYLIC ACID, 1,4-CYCLOHEXANEDIMETHANOL AND ETHYLENE GLYCOL

[75] Inventors: John C. Morris; Winston J. Jackson, Jr., both of Kingsport, Tenn.

[73] Assignee: Eastman Kodak Company, Rochester, N.Y.

[21] Appl. No.: 288,901

[22] Filed: Dec. 23, 1988

[51] Int. Cl.$^4$ .............................................. C08G 63/02
[52] U.S. Cl. .................................. 528/272; 528/298; 528/302; 528/305; 528/308; 528/308.6; 525/419; 525/437; 264/176.1; 264/177.13; 264/209.1; 264/210.7; 264/219
[58] Field of Search .............. 528/272, 298, 302, 305, 528/308, 308.6; 525/419, 437; 264/176.1, 177.13, 209.1, 210.7, 219

[56] References Cited

U.S. PATENT DOCUMENTS

| | | | |
|---|---|---|---|
| 2,657,194 | 10/1958 | Butler et al. | 528/301 |
| 2,976,266 | 3/1961 | Lytton et al. | 528/280 |
| 3,030,335 | 4/1962 | Goldberg | 528/85 |
| 3,190,764 | 6/1965 | Cardina | 427/333 |
| 3,247,043 | 4/1966 | Cardina | 156/314 |
| 3,317,466 | 5/1967 | Caldwell et al. | 528/190 |
| 3,842,040 | 10/1974 | Browne et al. | 528/364 |
| 3,842,041 | 10/1974 | Browne et al. | 528/279 |
| 3,909,489 | 9/1975 | Callander | 524/405 |
| 4,073,777 | 2/1978 | O'Neill et al. | 528/295 |
| 4,728,717 | 3/1988 | Morris et al. | 528/306 |
| 4,728,718 | 3/1988 | Morris et al. | 528/306 |
| 4,728,719 | 3/1988 | Morris et al. | 528/306 |
| 4,728,720 | 3/1988 | Morris et al. | 528/306 |
| 4,739,033 | 4/1988 | Morris et al. | 528/306 |
| 4,742,151 | 5/1988 | Tate et al. | 528/272 |

FOREIGN PATENT DOCUMENTS

1935252 7/1969 Fed. Rep. of Germany.

OTHER PUBLICATIONS

Watanabe et al., *Macromolecules,* 21(1), pp. 278-280 (1988).
*Kobunshi Ronbunshu,* vol. 44(12), 983-986 (Dec., 1987).
Jackson et al., *Journal of Applied Polymer Science, Applied Polymer Symposia,* 41, 307-326 (1985).
Krigbaum et al., *Journal of Applied Polymer Science, Polymer Letters Edition,* 20, 109-115 (1982).
Krigbaum et al., *Polymer,* 24(10), pp. 1299-1307 (1983).
Derwent Abstracts No. 314136 for JP 57198726A.
Derwent Abstract No. 321518 for JP 61236821A.
Meurisse et al., British Polymer Journal, vol. 13, 1981, p. 57.

*Primary Examiner*—John Kight
*Assistant Examiner*—Samuel A. Acquah
*Attorney, Agent, or Firm*—Mark A. Montgomery; William P. Heath, Jr.; Thomas R. Savitsky

[57] ABSTRACT

Disclosed are copolyesters comprising an acid component of 4,4'-biphenyldicarboxylic acid and a glycol component comprising 1,4-cyclohexanedimethanol and ethylene glycol. The copolyesters exhibit unusually high tensile strength.

17 Claims, No Drawings

COPOLYESTERS FROM 4,4'-BIPHENYLDICARBOXYLIC ACID, 1,4-CYCLOHEXANEDIMETHANOL AND ETHYLENE GLYCOL

FIELD OF THE INVENTION

The present invention concerns copolyesters from 4,4'-biphenyldicarboxylic acid, 1,4-cyclohexanedimethanol and ethylene glycol that have unusually high tensile strengths.

BACKGROUND OF THE INVENTION

Homopolyesters of 4,4'-biphenyldicarboxylic acid and certain aliphatic glycols are disclosed in the literature. Homopolyesters of 4,4'-biphenyldicarboxylic acid and ethylene glycol, 1,4-butanediol, and 1,6-hexanediol are disclosed by Meurisse et al., in the *British Polymer Journal*, Volume 13, page 57 (1981) (Table 1). Jackson and Morris include a review of homopolyesters from 4,4'-biphenyldicarboxylic acid and various aliphatic glycols in the *Journal of Applied Polymer Science, Applied Polymer Symposia*, 41, 307–326 (1985). Krigbaum et al., disclose relatively low molecular weight homopolyesters from 4,4'-biphenyldicarboxylic acid and various aliphatic glycols in the *Journal of Applied Polymer Science, Polymer Letters Edition*, 20, 109–115 (1982). Low molecular weight homopolyesters of 4,4'-biphenyldicarboxylic acid are also disclosed by Wanatabe et al., *Macromolecules*, 21(1), p. 278–280 (1988), and Krigbaum et al., *Polymer*, 24(10, p. 1299–1307 (1983). Jpn. Kokai Tokkyo Koho JP 61,236,821 [86,236,821] (1986) also discloses low molecular weight polyesters from 4,4'-biphenyldicarboxylic acid and 1,4-butanediol prepared below their melting temperatures in a nonvolatile liquid. Polyesters of 1,6-hexanediol and 4,4'-biphenyldicarboxylic acid are disclosed in *Kobunshi Ronbunshu*, Vol. 44(12), 983–986 (December 1987) having limiting viscosity number of about 0.31.

U.S. 3,842,040 and U.S. 3,842,041 disclose the homopolyester of 4,4'-biphenyldicarboxylic acid and ethylene glycol.

German Offenlegungsschrift, DE 1935252, discloses polyesters of two aromatic dicarboxylic acids which include 4,4-biphenyldicarboxylic acid 10 to 50 mol %, 50 to 90 mol % of terephthalic acid and the two glycols ethylene glycol and 1,4-cyclohexanedimethanol. Example 4 in this patent discloses a copolyester of 4,4'-biphenyldicarboxylic acid (BDA), ethylene glycol (EG), and 1,4-cyclohexanedimethanol (CD) of unknown composition having a melting point of about 300°–305° C. and a relatively low inherent viscosity (I.V.) of 0.5. High molecular weight copolyesters of BDA, EG, and CD are not specifically disclosed.

Japanese patent, Kokai Tokkyo Koho JP 57/198726 discloses copolyesters containing 25–80 mol % 4,4'-biphenyldicarboxylic acid with various aliphatic glycols and aromatic dicarboxylic acids.

Another patent which may be of interest is U.S. 2,976,266 which broadly discloses copolyesters prepared from 4,4'-biphenyldicarboxylic acid and certain aliphatic glycols. Copolyesters of BDA and EG but not CD are specifically disclosed in column 2, line 70 of U.S. 2,976,266 in a general listing along with other aliphatic glycols useful in this disclosed invention. High molecular weight copolyesters of BDA, EG, and CD are not specifically disclosed.

Another patent which may be of interest is U.S. 4,742,151 which discloses ultra-high-molecular weight polyesters prepared from aromatic dicarboxylic acids and alkylene glycols containing from 2 to 6 carbons having an intrinsic viscosity greater than 1.5. 4,4'-Biphenyldicarboxylic acid is disclosed in a list of dicarboxylic acids useful to the disclosed invention.

Heretofore, copolyesters of 4,4'-biphenyldicarboxylic acid, 1,4-cyclohexanedimethanol and ethylene glycol have been unknown.

SUMMARY OF THE INVENTION

The present invention is directed to a copolyester comprising
(A) an acid component comprising repeating units of at least 80 mol % 4,4'-biphenyldicarboxylic acid, and
(B) a glycol component comprising repeating units of from about 90–20 mol % 1,4-cyclohexanedimethanol, and about 10–80 mol % ethylene glycol.

wherein the total mol % of acid component and glycol component are each 100 mol %.

The present invention is also directed to a composition comprising:
(i) about 30 to 99 weight percent of the copolyester of the present invention, and
(ii) about 1 to 70 weight percent of at least one property modifier.

DETAILED DESCRIPTION OF THE INVENTION

The prior art describes molding, spinning, and film extrusion as viable processes for shaping the polyesters based on 4,4'-biphenyldicarboxylic acid. We have discovered a range of polyester compositions within this broad disclosure based on 4,4'-biphenyldicarboxylic acid, 1,4-cyclohexanedimethanol, and ethylene glycol having exceptionally high tensile strength.

Injection-molded bars comprising at least 80 mol % 4,4'-biphenyldicarboxylic acid units, 20 to 90 mol % 1,4-cyclohexanedimethanol units, and 80 to 10 mol % ethylene glycol units have a combination of unexpectedly high tensile strength and flexural modulus at an inherent viscosity above about 0.6, but preferably about 0.8 or more. The homopolyester of 1,4-cyclohexanedimethanol in Table 1 (of the Example contained herein) has a tensile strength of 5,800 pounds per square inch (psi). The homopolyester of ethylene glycol with BDA is too high melting to mold without problems of severe decomposition. Modification of the homopolyester of BDA and 1,4-cyclohexanedimethanol with as little as 10 mol % of ethylene glycol raises the tensile strength substantially. Increasing the ethylene glycol content further substantially increases the tensile strength. Likewise, our copolyesters exhibit the same unexpected increase in flexural modulus, rising from 280,000 psi for the unmodified (BDA) (CD) homopolyester to well over about 1,000,000 psi for copolyesters having at least about 44 mol % ethylene glycol content.

The polyesters of our invention also have excellent solvent resistance. Molded bars are substantially unaffected after exposure for 24 hours in a variety of solvents which include toluene, 1,2-dichloroethane, methyl isobutyl ketone, ethyl acetate, ethanol, water, sulfuric acid, 10% sodium hydroxide, gasoline, acetone, acetic acid, 5% Clorox bleach, 50/50 water/ethanol, benzyl alcohol, nitric acid and methylene chloride.

The copolyesters of this invention are prepared from 4,4'-biphenyldicarboxylic acid and/or its esters, 1,4-cyclohexanedimethanol and ethylene glycol. Examples of useful aromatic esters are the dimethyl, diethyl, dibutyl, and diphenyl esters or any combination of mixed esters. The polyesters may be prepared from glycol esters of BDA. The polyesters may be prepared in the melt or in the solid phase or by a combination of these processes.

In preferred copolyesters of the present invention the acid component is about 100 mol % of 4,4'-biphenyldicarboxylic acid. It is also preferred that the glycol component is about 60–40 mol % 1,4-cyclohexanedimethanol and about 40–60 mol % ethylene glycol.

The acid portion of the polyesters of the present invention (component (A)) may be substituted with less than about 20 mol %, but preferably, less than about 10 mol % of other aromatic dicarboxylic acids having up to 20 carbon atoms. Examples of suitable aromatic dicarboxylic acids include terephthalic, isophthalic, 1,5-, 2,6-, 2,7-naphthalenedicarboxylic, or trans-4,4'-stilbenedicarboxylic acids.

Likewise, the glycol portion of the polyesters (component (B)) may be substituted with less than about 10 mol % of other aliphatic glycols having 3 to 20 carbon atoms so long as the combination of high tensile strength and flexural modulus remain substantially unaffected. Examples of useful glycols are 1,2-propanediol, 1,3-propanediol, 1,4-butanediol, 1,5-pentanediol, 1,6-hexanediol, and p-xylene glycol.

The copolyesters of the present invention preferably have tensile strengths of greater than 8,000 psi; more preferably greater than 12,000.

In the composition of the present invention it is preferred that component (i) is present in an amount of about 50 to about 95 weight percent, and component (ii) is present in an amount of about 5 to about 50 weight percent.

In the composition of the present invention it is preferred that component (ii) is a property modifier selected from polyamides such as Nylon 6,6 from Du Pont, poly(ether-imides) such as ULTEM a poly(ether-imide) from General Electric, polyphenylene oxides such as poly(2,6-dimethylphenylene oxide) or poly(phenylene oxide)/polystyrene blends such as the Noryl 1000, a blend of poly(2,6-dimethylphenylene oxide and polystyrene resins from General Electric, polyesters, polyphenylene sulfides, polyphenylene sulfide/sulfones, poly(ester-carbonates), polycarbonates such as LEXAN a polycarbonate from General Electric, polysulfones, polysulfone ethers, and poly(ether-ketones) of aromatic dihydroxy compounds. The aromatic dihydroxy compounds used to prepare these polymers are disclosed in U.S. Pat. Nos. 3,030,335 and 3,317,466.

Component (ii) of the composition of this invention may also be conventional flame retardants such as phosphorus compound, a halogen compound, or a halogen compound in combination with an antimony compound, or fillers such as talc or mica, or reinforcing agents such as glass fiber, KEVLAR a (poly(1,4-phenylene terephthalamide)), or carbon fiber.

It is preferred that the copolyester and/or composition of the present invention is in the form of a fiber, a film, a container, or a molded object.

The following examples are to illutrate the invention but should not be interpreted as a limitation thereon.

Inherent viscosities are determined at 25° C. in 25/35/40 (wt./wt./wt.) phenol/teterachloroethane/p-chlorophenol at a concentration of 0.1 gram (g)/100 milliliters (mL). The melting points are determined on a Perkin-Elmer DSC 2B Differential Scanning Calorimeter at a scan rate of 20° C./minute. Compositions are determined using proton nuclear magnetic resonance spectroscopy.

The polyesters are ground to pass a 3-millimeter (mm) screen, dried at 100° C. in a vacuum oven for 24 hours, and injection-molded on a Boy 22S screw-type injection molding machine or when necessary a 1-ounce (oz) Watson-Stillman plunger-type molding machine to give 1/16-inch (in.) thick D1822 Type L tensile bars and ⅛×1/16×5-inch flexure bars. The tensile strength is determined following the procedure of ASTM D638 and the flexural modulus is determined according to ASTM D790.

EXAMPLE 1

This example illustrates the preparation of the copolyester consisting of 100 mol % 4,4'-biphenyldicarboxylic acid units, and 56 mol % 1,4-cyclohexanedimethanol units, and 44 mol % ethylene glycol units.

A mixture of 216.0 g (0.80 mol) dimethyl 4,4'-biphenyldicarboxylate, 98.7 g (0.48 mol) 1,4-cyclohexanedimethanol (70/30 trans/cis) (70% in methanol), 49.6 g (0.80 mol) ethylene glycol, and 0.15 g titanium tetraisopropoxide is placed in a 1-liter flask equipped with an inlet for nitrogen, a metal stirrer, and a short distillation column. The flask is heated at 200° C. for about 2½ hours, at 220° C. for 1 hour, and then the temperature is raised to 300° C. for about 10 minutes. A vacuum of 0.5 mm is gradually applied over the next 5 minutes. Full vacuum is maintained for about 18 minutes. A high melt viscosity, white crystalline polymer is obtained with an I.V. of 1.07 and a melting point of 271° C.

The polymer is injection molded at 270° C. on the Boy 22S molding machine to give tensile bars with 40,000 psi tensile strength.

The other examples in Table 1 are prepared and injection molded in a similar manner. The copolyesters of Table 1 have an acid component of 100 mol % BDA.

TABLE 1

Effect of Composition on the Tensile Strength of 4,4'-Biphenyldicarboxylic Acid/1,4-Cyclohexanedimethanol/Ethylene Glycol Polyesters

| CD, Mol % | EG Mol % | DSC, Tm, °C.[a] | Molding Temp., °C.[b] | Molding I.V. Before | Molding I.V. After | Tensile Strength, psi | Flexural Modulus, $\times 10^5$ psi |
|---|---|---|---|---|---|---|---|
| 100[c] | 0 | 338 | 350 | 0.90 | 0.60 | 5800 | 2.8 |
| 90[c] | 10 | 317 | 340 | 1.24 | 1.10 | 8200 | 3.9 |
| 85 | 15 | 314 | 300 | 1.07 | 0.72 | 9900 | 2.9 |
| 72 | 23 | 287 | 280 | 1.09 | 0.89 | 23000 | 5.0 |
| 56 | 44 | 271 | 270 | 1.07 | 0.95 | 40000 | 10.7 |

TABLE 1-continued

Effect of Composition on the Tensile Strength of
4,4'-Biphenyldicarboxylic Acid/1,4-Cyclohexanedi-
methanol/Ethylene Glycol Polyesters

| CD, Mol % | EG Mol % | DSC, Tm, °C.[a] | Molding Temp., °C.[b] | Molding I.V., Before | Molding I.V., After | Tensile Strength, psi | Flexural Modulus, × 10⁵ psi |
|---|---|---|---|---|---|---|---|
| 38 | 62 | 279 | 270 | 1.11 | 1.02 | 45000 | 15.5 |
| 20 | 80 | 318 | 300 | 1.16 | 0.89 | 42000 | 16.7 |
| 0[d] | 100 | 356 | — | — | — | — | — |

[a]Melting point in °C. as determined by Differential Scanning Calorimetry.
[b]The molding temperature is the set temperature of the last two zones of the Boy 22S molding machine. The actual melt temperatures are about 20–30° C. above the molding temperatures.
[c]This polymer will not mold on the Boy 22S molding machine due to excessive thermal degradation. Instead, the polymer was molded on the Watson-Stillman molding machine. The molding temperature is the temperature of the barrel of the Watson-Stillman molding machine.
[d]This polymer melts too high to mold.

The invention has been described in detail with particular reference to preferred embodiments thereof, but it will be understood that variations and modifications can be effected within the spirit and scope of the invention.

We claim:

1. A copolyester comprising
   (A) an acid component comprising repeating units of at least 80 mol % 4,4'-biphenyldicarboxylic acid, and
   (B) a glycol component comprising repeating units of from about 90–20 mol % 1,4-cyclohexanedimethanol, and about 10–80 mol % ethylene glycol, wherein the total mol % of acid component and glycol component are each 100 mol %, and wherein said copolyester has an inherent viscosity of at least about 0.6 determined at 25° C. in 25/35/40 (wt./wt./wt.) phenol/tetrachloroethane/p-chlorophenol at a concentration of 0.1 g./100 ml.

2. The copolyester of claim 1 wherein the acid component is about 100 mol % of 4,4'-biphenyldicarboxylic acid.

3. The copolyester of claim 1 wherein the glycol component is about 60–40 mol % 1,4-cyclohexanedimethanol and about 40–60 mol % ethylene glycol.

4. The copolyester of claim 2 wherein the glycol component is about 50 mol % 1,4-cyclohexanedimethanol and about 50 mol % ethylene glycol.

5. The copolyester of claim 1 having an inherent viscosity of at least about 0.8 determined at 25° C. in 25/35/40 (wt./wt./wt.) phenol/tetrachloroethane/p-chlorophenol at a concentration of 0.1 g./100 ml.

6. The copolyester of claim 1 wherein the acid component comprises at least about 90 mol % 4,4'-biphenyldicarboxylic acid and less than about 10 mol % of at least one other aromatic dicarboxylic acid having up to 20 carbon atoms; and the glycol component comprises less than about 10 mol % of at least one other aliphatic glycol having 3 to 20 carbon atoms.

7. The copolyester of claim 6 wherein said other dicarboxylic acid is terephthalic acid, isophthalic acid, 1,5-naphthalenedicarboxylic acid, 2,6-naphthalenedicarboxylic acid, 2,7-naphthalenedicarboxylic acid, or trans-4,4'-stilbenedicarboxylic acid; said other aliphatic glycol is 1,2-propanediol, 1,3-propanediol, 1,4-butanediol, 1,5-pentanediol, or 1,6-hexanediol, or p-xylene glycol.

8. The copolyester of claim 1 having a tensile strength of greater than 8,000 psi.

9. The copolyester of claim 1 having a tensile strength at greater than about 12,000 psi and a flexural modulus of greater than about 400,000 psi.

10. A fiber comprising the copolyester of claim 1.

11. The fiber of claim 10 wherein the copolyester is the copolyester of claim 2.

12. A film comprising the copolyester of claim 1.

13. The film of claim 12 wherein the copolyester is the copolyester of claim 2.

14. A molded object comprising the copolyester of claim 1.

15. The molded object of claim 14 wherein the copolyester is the copolyester of claim 2.

16. A container comprising the copolyester of claim 1.

17. The container of claim 16 wherein the copolyester is the copolyester of claim 2.

* * * * *